Fuld & Cox,
Cook Stove.
BEST AVAILABLE COPY
№ 18.
(A.I.) Patented Dec. 5. 1838.
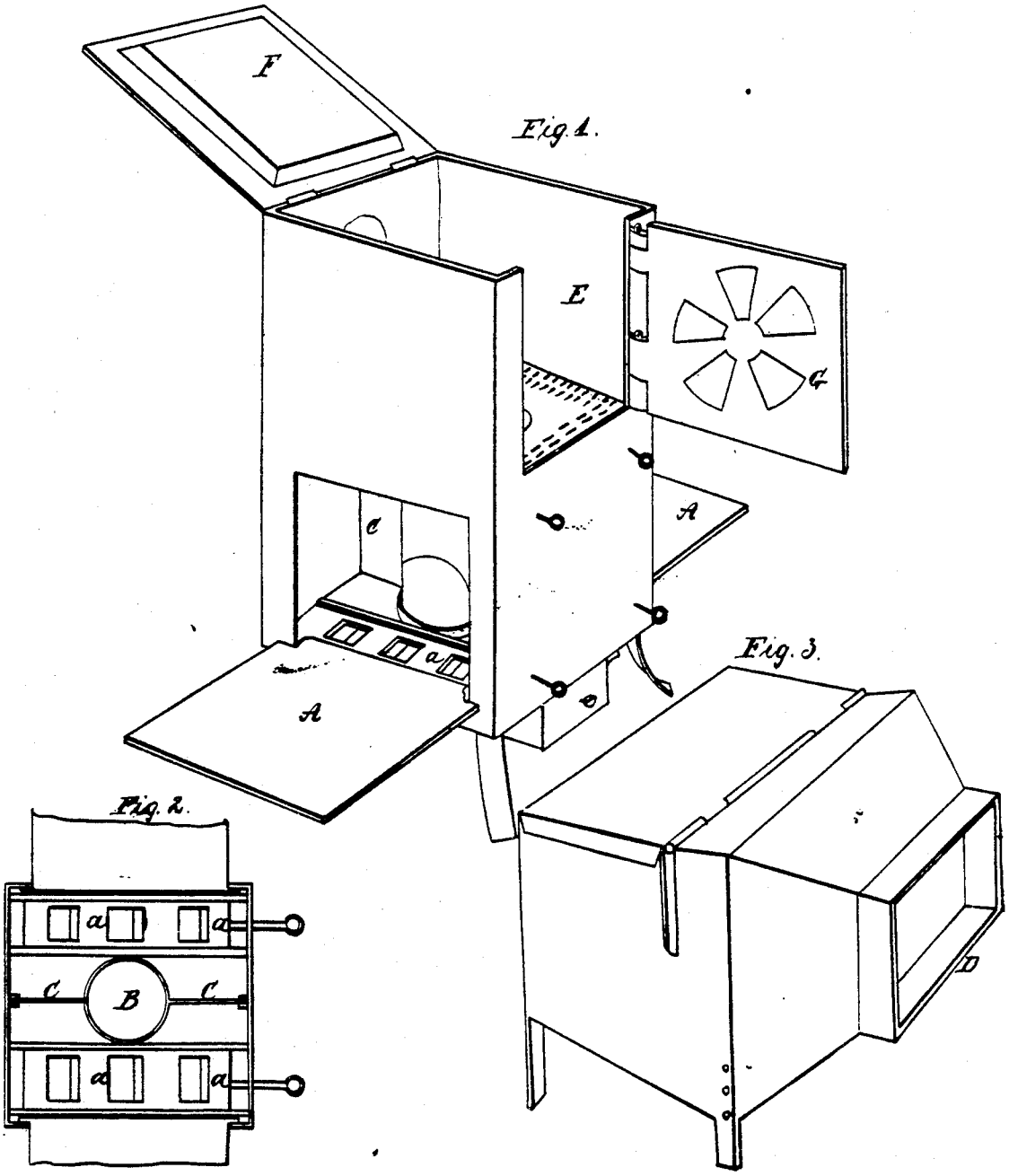
H. PETERS, PHOTO-LITHOGRAPHER, WASHINGTON, D. C.